Patented Aug. 14, 1945

2,382,532

UNITED STATES PATENT OFFICE 2,382,532

VULCANIZED FATTY OIL EMULSIONS

László Auer, South Orange, N. J.

No Drawing. Application December 4, 1942,
Serial No. 467,904

27 Claims. (Cl. 106—170)

GENERAL FIELD OF INVENTION AND STATEMENT OF OBJECTS

This invention relates to dispersions or emulsions and is concerned both with the formation of such dispersions and also with new dispersion products.

Although the term "emulsion" is sometimes applied only to that class of colloidal dispersions wherein both the dispersed phase and dispersion medium are liquid, in technical literature the term "emulsion" is quite commonly applied to that type of dispersion in which the dispersed phase is a solid material, so long as the dispersion displays the general nature and behavior of liquid-liquid emulsions. Thus, for instance, rubber latex is commonly referred to as an emulsion, in spite of the fact that the rubber particles in the latex are solid. It is to be understood that herein the term emulsion is not employed in the narrow sense, but is used to apply to both types of dispersion.

The present invention is concerned with aqueous dispersions or emulsions of the oil-in-water type, wherein the dispersed phase consists of or incorporates a vulcanized fatty oil.

Before fully analyzing the nature of the invention, it is here further pointed out that, as is known, fatty oils may be vulcanized to different degrees or stages. For the purposes of the present application, the several stages or degrees of vulcanization may be divided into two classifications, i. e., partial vulcanization and full vulcanization. The manner in which these terms are here employed is pointed out just below.

During vulcanization of fatty oils, sulphur is ordinarily mixed with the oil and the mixture heated to an elevated temperature, for instance, from about 120° C. to about 200° C. During the first portion of the time of vulcanization, the oil is still liquid, and may remain so even after some considerable reaction of the sulphur with the oil. In these early stages of vulcanization, if the heating be terminated, the products are liquid at room temperature or are reversibly fusible and thermoplastic. Furthermore, the entire mass of the mixture may be soluble in certain organic solvents. Products of this degree of vulcanization are herein considered as "partially" or semi-vulcanized products.

If the vulcanization be carried further, by continued heating, a solid mass is formed at the vulcanization temperature, which mass is infusible (except upon decomposition) and the mass as a whole is insoluble in organic solvents. Products having this degree of vulcanization are herein considered as "fully" or completely vulcanized products, notwithstanding the fact that in some cases further solidification might be effected by continued heating beyond the time at which the infusible mass is initially formed.

There are many examples in the art of partially vulcanized fatty oils which are sometimes referred to merely as sulphurized oils. On the other hand, examples of fully vulcanized products are the so-called "factices" or brown rubber substitutes sometimes used in rubber compounding.

Many attempts have been made to secure dispersions of the oil-in-water type with partially or fully vulcanized fatty oils, but in general, the results have not been fully satisfactory from a number of standpoints, particularly in the case of fully vulcanized materials. For instance, especially with fully vulcanized fatty oils, it has been very difficult to form the dispersion, and the characteristics of the dispersion secured have not always had fully satisfactory properties from the standpoint of viscosity (with a given degree of water content), stability, etc.

I have found formation of an oil-in-water dispersion of vulcanized fatty oils generally and especially of fully vulcanized fatty oils is facilitated to a surprising extent by the employment of methyl cellulose in combination with a wetting agent known to reduce the surface tension at the oil-water interface.

I have further found that vulcanized fatty oil dispersions or emulsions so produced, have exceptionally advantageous properties.

The dispersions according to the present invention are not only relatively easily formed, but also are easily dilutable with water, have good stability, and many of them may further have quite low viscosity for a given degree of dilution.

The foregoing and other advantageous properties of the dispersions produced according to this invention render the new dispersions capable of effective use in various situations where compatibility with water or capability of dilution with water is an advantage. For instance, the dispersions according to the present invention, containing partially or fully vulcanized fatty oils, are very useful when employed as rubber extenders, as for instance, by mixing the vulcanized oil dispersions with rubber latex, and/or synthetic rubber latices. Moreover, very good results are secured by employing the dispersions in coatings to be applied to porous surfaces, made of paper, stucco, wood, plaster, cement, etc., such as walls and/or floors. Still further, emulsions of the roofing compound type may advantageously be prepared to contain both an asphalt and a vulcanized fatty oil dispersed in water according to this invention.

Various of the distinctive and advantageous properties of the dispersions of the present invention are considered more fully hereinafter, but it is here further mentioned that employment of dispersions containing methyl cellulose is of advantage for many uses because of the fact that methyl cellulose is only very difficultly soluble in cold water and insoluble in boiling water. In general, emulsifying agents and protective colloids heretofore employed are very readily water soluble and do not lose this characteristic when coating compositions containing them are undergoing the film-forming (drying) process. The presence of such readily water soluble agents reduces the water and weather resistance of the films. Therefore, when methyl cellulose is used, for instance, in emulsions of varnishes, impregnating compositions or in other materials where weather resistance is of importance, films may be deposited, which films have a high degree of water resistance. Still other advantageous properties of the emulsions are mentioned hereinafter.

THE STARTING MATERIAL

The invention is applicable to the emulsification of vulcanized fatty oils generally, either in the partially or the fully vulcanized state.

A typical list of such fatty oils is as follows:

Tung oil
Oiticica oil
Dehydrated castor oil
Linseed oil
Perilla oil
Sunflower oil
Poppyseed oil
Soya bean oil
Walnut oil
Rapeseed oil
Pine seed oil
Olive oil
Corn oil
Cottonseed oil
Coconut oil
Babassu oil
Hydroxylated oils such as castor oil, etc.
Fish oils (train oils)

In addition, it should be noted that esters of fatty acids other than the natural glycerin esters (fatty oils) may be used, for example, synthetic glycerin esters of fatty acids, and fatty acid esters formed with other polyhydric alcohols, such as glycols, pentaerythritol, mannitol, sorbitol, etc.

Vulcanized alkyd resins of the types containing fatty acids and polyhydric alcohols may also be dispersed according to the present invention.

Still further, other combinations of materials may be used as the starting material. Thus, in addition to dispersion of partially or fully vulcanized fatty oils themselves, the invention contemplates dispersion of mixtures of vulcanized fatty oils with resins, such as rosin or other resins used in making oleo-resinous varnishes. Other useful composite materials are vulcanized fatty oils with solvents; and vulcanized fatty oils mixed both with resins and solvents. Still other varnish type materials may be dispersed according to the invention in which an oil-plus-resin mixture is jointly vulcanized prior to dispersion.

Many of the varnishes or varnish bases comprise mixtures of materials of the types mentioned just above and, in general, the invention contemplates dispersion of varnish bases, thereby yielding new and useful dispersion products of particular utility in the field of coating or impregnating compositions. Herein the term varnish base is used to refer to the varnish solids, usually fatty oils or fatty oil and resin mixtures, and sometimes also suitable resins alone.

Fully vulcanized oil dispersion products of particular utility may be secured where the fatty oil is first bodied to an extensive degree prior to the vulcanization and dispersion thereof. For example, dispersions having especially good characteristics in combination with latex may be secured by dispersing the heat bodied and vulcanized oil products made according to the disclosure of copending application Serial No. 439,513, filed April 18, 1942, or in accordance with Patent No. 2,234,545, issued March 11, 1941. One example of a particularly advantageous heavy bodied and vulcanized fatty oil dispersion is one made with a fatty oil which is preliminarily treated (prior to vulcanization) by bubbling $SO_2$ therethrough at elevated temperatures. A pretreatment to heat body to a viscosity at least as high as Q on the Gardner scale yields products having especially desirable properties for many purposes.

Other fully vulcanized oils may also be dispersed to advantage in accordance with the present invention.

In addition to dispersions made with fatty oils vulcanized with sulphur, dispersions may also be made from so-called "white" rubber substitutes, i. e., fatty oils which are vulcanized with sulphur chloride, this usually being accomplished at temperatures considerably lower than those employed when employing sulphur.

DISPERSION PROCEDURE

In considering the dispersion procedure, it is first noted that dispersion may be effected with any of several different known types of equipment, and also in accordance with several different general modes or methods of dispersion, the important consideration from the standpoint of this invention being the presence of methyl cellulose in the dispersion produced and also of a wetting agent, the latter being of a type known to reduce the surface tension of the oil-water interface.

As to equipment and methods in general, with certain materials, especially those which are quite liquid at room temperature, mere mixture and agitation of the materials may suffice. Mixtures of the materials on a roller mill of the types employed in grinding pigments into paints may also be adopted, this practice being quite effective for certain materials, especially materials which are solid or semi-solid at normal room temperatures, as are the fully vulcanized fatty oils.

When a three roller paint mill is employed for dispersion, it will be found advantageous to set the first two rollers quite close together, the third or take-off roller being separated from the middle roller. The material to be dispersed is placed on the first two rollers and worked until uniform. During this initial working, it is frequently of advantage to maintain a temperature differential between the first and second rollers, (customarily accomplished by circulating a cooling liquid through the second roller), the result of which is that the material remains primarily on the second or middle roller, with little or none on the first roller. The liquids or solutions added at the time of dispersion are preferably added slowly or in increments, and after all additions are made, the take-off roller may be adjusted so as to pick the material up from the middle roller, the material finally being removed from the take-off roller by the usual doctor blade, and collected in any suitable receptacle.

Again mixture and dispersion may be effected by placing the materials in a kneading machine of the Werner and Pfleiderer type. Other machines of this general type are, for instance, the so-called Banbury and Baker-Perkins mixers. The Werner and Pfleiderer mixer is particularly effective in handling relatively heavy materials and secures thorough dispersion in many instances where such dispersion is otherwise very difficult to attain.

When effecting dispersion with a kneading machine of the Werner and Pfleiderer type, it is advantageous to initially place the vulcanized material in the machine for preliminary working, after which the liquids or solutions added at the time of dispersion are desirably added in increments.

It may also be mentioned that when employing a machine of the Werner and Pfleiderer type, the cover or lid overlying the mixing blades should be applied, and moreover, should be brought close to the mixing blades, so as to give a shearing action not only between the casing below the blades but also between the lid and the blades. Otherwise, the material frequently has a tendency to roll around above the blades, thereby impairing the mixing. Many kneading machines are designed in such a way that the lid is close to the blades and the above mentioned shearing action takes place. In equipment, however, where there is considerable room between the upper portion of the blades and the lid an auxiliary lid should advantageously be made to satisfy this requirement.

In employing any of the foregoing means of securing dispersion, at least some heat may be advantageously applied. In general, where some heating is advantageous, the dispersion is most conveniently effected in a Werner and Pfleiderer mixer, which is equipped to be heated by an external jacket and/or through the kneading blades. In cases where simple agitation is sufficient, the vessel may be heated in any suitable manner.

METHYL CELLULOSE

Methyl cellulose is a cellulose ether which is difficultly soluble in cold water, and insoluble in boiling water. It is commercially available in various viscosity ranges. Preferably, according to the present invention, it is used in a form having relatively low viscosity, since aqueous solutions of the low viscosity methyl cellulose are easier to prepare than the solutions of high viscosity methyl cellulose. A suitable range of methyl cellulose viscosity extends from about 15 centipoises to about 25 centipoises (cps) in 2% aqueous solution. However, for specific purposes it may be advantageous to use methyl cellulose having a higher viscosity than 25 centipoises.

I have found methyl cellulose to be a highly desirable ingredient in vulcanized fatty oil dispersions, and especially where the oil is fully vulcanized. In addition to the advantages of ease of dispersion and emulsion stability, which advantages are attributable at least in part to the employment of methyl cellulose, the presence of methyl cellulose does not detrimentally influence other properties of the emulsion or of the coating films or other materials made therefrom. In fact, various advantageous properties of, for instance, coating films made from the emulsions, are even enhanced by the presence of methyl cellulose.

To illustrate the above, the very fact that methyl cellulose is only difficultly soluble in cold water and insoluble in hot water, is of distinct advantage, for instance, in coating compositions, impregnating compositions or in other materials wherein water and weather resistance are of importance, as explained above.

Moreover, methyl cellulose is neutral and therefore does not alter the pH value of the emulsions or dispersions. The importance of this will be apparent if it be kept in mind that the particles of the dispersed phase of a dispersion frequently manifest a tendency to adsorb emulsifying or stabilizing agents present; and that such adsorption of agents capable of changing the pH value, not infrequently reaches the critical stage at which undesired and premature precipitation occurs. Since methyl cellulose is neutral, adsorption thereof into the particles of the dispersed phase will not have a tendency to approach the critical stage just mentioned, and therefore emulsions containing methyl cellulose are more "storage resistant" than are many other dispersions, particularly where the dispersion is made with a vulcanized oil in which the stage of vulcanization is well advanced, for instance, with fully vulcanized fatty oils.

I have found, moreover, that methyl cellulose has the capability of forming an "envelope" around the particles of the dispersed phase, thereby safeguarding the stability of the emulsion. Such an envelope is sometimes referred to as a layer of solvation.

As above noted, many of the characteristics of methyl cellulose are of peculiar importance and advantage in the field of aqueous dispersions of coating compositions, or with other materials in which water resistance of the films or other deposits formed is of advantage.

The methyl cellulose may be dispersed in the materials being emulsified in different ways, depending somewhat on the nature of the materials being emulsified. However, in general, I prefer to introduce the methyl cellulose in the form of an aqueous solution, small portions of which are successively added, the latter procedure being of especial importance when emulsifying relatively solid materials, such as fully vulcanized fatty oils.

The concentration of the methyl cellulose in the solution employed for introducing it into the mixture may vary over a considerable percentage range, although I have found effective results are secured with a solution in which the methyl cellulose constitutes from about 1% to about 5%. Highly effective results have been obtained by the employment of a solution of about 2% concentration.

The total quantity of methyl cellulose need not be more than a very small percentage, even down to about 0.1% (based on the solid content of the dispersion) being effective in many cases. Naturally, the methyl cellulose need only be used in that quantity required to serve its intended functions, any excess usually being uneconomical from the standpoint of use of materials. From a very small fraction of 1%, for instance, from about 0.01% or 0.05% up to about 2% (based on the solid content) is sufficient for most purposes.

With regard to the quantity of methyl cellulose present, it is noted that in general, the percentage (based on the content of dispersed phase) should be increased in accordance with the quantity of water present.

WETTING AGENT

As above indicated, the dispersion should also contain a wetting agent. Most of such wetting agents are soaps, or sulphonated organic compounds or their salts, such as fatty alcohol sulphonates or their salts (fatty alcohol sulphates), amongst others. Specific examples of useful wetting agents other than soaps are as follows:

| Trade name and source | Manufacturer's description |
| --- | --- |
| Duponol ME—E. I. du Pont de Nemours & Co. | Fatty alcohol sulphate. |
| Aerosol OT—American Cyanamid Co. | Dioctyl ester of sodium sulphosuccinic acid. |
| Emulphor AG—General Dyestuff Corp. | Polyethyleneoxide condensation product. |
| Nekal A—General Dyestuff Corp. | Sodium salt of alkyl-substituted naphthalene sulphonate. |
| Igepon—General Dyestuff Corp. | Sodium sulphonate of an oleic acid ester of an aliphatic compound, for instance, of the type of $C_{17}H_{33}$-$CON\text{-}CH_2C_2H_4SO_3Na$. |
| Triton—Rohm & Haas | Sodium salt of aryl alkyl poly ether sulphonate. |
| Emulgor A—Glyco Products. | A highly-polymerized glycol ester. |
| Wetanol—Glyco Products | Modified sodium salts of sulphated fatty alcohols. |
| Darvan #1—R. T. Vanderbilt Co. | Polymerized sodium salts of alkyl naphthalene sulphonic acids. |
| Hornkem—Hornkem Corp | Purified sulpholignin. |

The foregoing list is merely illustrative. It should be noted that wetting agents (or, more commonly, "surface-active" agents) in general seem to be effective. The capacity to reduce surface tension at the oil-water interface is the criterion, whether or not this effect is due to the presence of a sulphuric acid radical in the compound.

Still further, I have found that soaps constitute a highly effective group of materials to be employed as wetting agents, for instance, ammonium soaps, amine soaps and alkali metal soaps. Such soaps may be produced in situ during emulsification by adding a solution of a base, to the mixture, which may form a soap with free fatty acids present in the vulcanized oil or with free resin acids present in the resin portion of the varnish base, if such is used. Examples of such bases are: alkali hydroxides, such as sodium hydroxide, aqueous solutions of ammonia and of organic amines, for instance: triethanolamine, morpholine, etc.

The addition of sodium hydroxide or of other aqueous solutions of soap forming bases, so as to form the soap in situ, is highly advantageous in the dispersion produced, especially when the dispersion comprises or is to be incorporated in natural and synthetic rubber latices. The reason for this will be apparent if it be kept in mind that at least most of the vulcanized fatty oil products contain some free fatty acids which, as herein above indicated, may be of a quantity sufficient to bring the pH value of the dispersion close to or beyond that critical point where premature precipitation will occur.

By addition of sodium hydroxide or other similar soap forming compound, a wetting agent is formed in situ, thereby further enhancing the stability and storage-resistance of the dispersion being produced.

Beyond the foregoing, I have found that the mobility of the dispersion (with a given quantity of water present) is lower (higher viscosity) where the dispersed phase shows an appreciable acid number. The closer the dispersed phase is brought to neutrality, the more fluid or less viscous will be the dispersion obtained. Therefore, for many purposes it is advantageous to form the soap in situ by adding approximately that quantity of soap forming compound which will bring the acid number of the dispersed phase close to the point of neutrality. Addition of excess alkali apparently does not further reduce the viscosity, although for at least some purposes excess alkali should be avoided because under extreme conditions it may saponify a part of the neutral fatty acid esters.

If desired, soaps may be added directly instead of being formed in situ, or in both ways.

The wetting agent may be introduced into the material being dispersed in various different ways and in different stages of the dispersion process. In some cases, as stated above, I prefer to introduce the wetting agent or the compound capable of forming the wetting agent in situ by adding such agents or compounds in aqueous solution.

EFFECT OF JOINT OR SEQUENTIAL ADDITION OF METHYL CELLULOSE AND WETTING AGENT

In general, it may be stated that the methyl cellulose and wetting agent may be introduced into the materials being dispersed either jointly or in sequence. However, for certain purposes, and with certain materials, with different vulcanized fatty oils, and when employing different types of dispersion equipment, there are advantages in selecting certain particular ways of adding the methyl cellulose and the wetting agent.

By way of example, consider dispersion of a fully vulcanized fatty oil in the presence of both methyl cellulose and sodium hydroxide, (to form a soap in situ). When forming such a dispersion on a paint mill of the three roller type, as above described, it will be found advantageous to add the methyl cellulose solution prior to addition of the sodium hydroxide solution. On the other hand, where a dispersion of this type is being made on a kneading machine, for instance, of the Werner and Pfleiderer type, it will be found advantageous to first add the sodium hydroxide solution, and therafter the methyl cellulose solution.

The addition of sodium hydroxide and various other soap forming compounds or the soaps themselves prior to addition of the methyl cellulose has a tendency to make the vulcanized oil dry or doughy which is a disadvantage when working on the paint mill, but is an advantage when working in a kneading machine. Thorough admixture and dispersion is not readily secured on a paint mill if the mixture has a flaky or doughy consistency, although that very consistency is well adapted to thorough mixing and dispersion in a machine of the kneading type.

The methyl cellulose and wetting agent may, if desired, be preliminarily placed in a common solution and added jointly in that form. Where only partially vulcanized fatty oils are being dispersed, especially where the vulcanized fatty oil is of relatively low viscosity, simple agitation may be adopted in order to mix in the methyl cellulose solution and the wetting agent (or compounds for forming the wetting agents in situ).

EXAMPLES

EXAMPLES 1 TO 3 (COMPARATIVE SERIES)

In a group of three comparative examples, the same vulcanized fatty oil was dispersed in the presence of methyl cellulose, in each example of this group a different wetting agent being employed.

The vulcanized oil was prepared as follows:

100 parts of raw linseed oil were heated to 150° C., and 15 parts sulphur were added, with agitation. The mixture was kept at 150° C., and the agitation continued until sulphur no longer crystallized out of a sample upon cooling of such sample upon a stirring rod. At this time the mass was permitted to cool to 130° C., and kept at that temperature until it became highly viscous, but not gelled, whereupon it was permitted to cool to room temperature.

Example 1

A batch of 100 grams of the foregoing partially vulcanized oil was worked on a paint mill of the type described above and to this were added 16 grams of a 10% aqueous sodium hydroxide solution and 52 grams of a 2% aqueous methyl cellulose solution, in that order. An additional 35.6 grams of water were added, making up a total mixture containing 50% solids. In this example the sodium hydroxide addition apparently formed a soap in situ by reaction with the free fatty acids present. At the same time, the addition of sodium hydroxide brought the acidity of the dispersed phase closer to neutrality, with advantages hereinabove disclosed. It was found that dispersion was readily effected at room temperature and that the resulting product was readily dilutable with water and remained stable.

Example 2

A batch of 100 grams of the foregoing partially vulcanized oil was worked on a paint mill and to this batch 5 grams of sodium stearate were added. Thereafter, 52 grams of a 2% aqueous methyl cellulose solution were incorporated, and finally 50 grams of water were added. The resulting dispersion was stable and readily dilutable with water. It indicated a tendency to increase viscosity on standing.

Example 3

Here again a 100 gram batch of the foregoing partially vulcanized oil was worked on a paint mill and 52 grams of a 2% aqueous "Duponol ME" solution, and 52 grams of a 2% aqueous methyl cellulose solution were added, in that sequence.

In various other examples and experiments referred to in several groups herebelow, the vulcanized fatty oil employed to form the dispersion was prepared in accordance with the disclosure of copending application Serial No. 439,513 above mentioned. Briefly, that procedure is as follows:

Raw linseed oil was treated with $SO_2$ and also with sodium hydroxide and thereafter vulcanized in accordance with the following steps, (the quantities mentioned in the several steps indicating proportions of materials, it being understood that a batch of any desired size may be carried through the process):

(1) 8014 gms. of raw linseed oil are heated in a 22 liter distilling flask up to 300° C. and the pressure reduced to 100 mm. of mercury; and during temperature rise and for five hours at 300° C., $SO_2$ is bubbled through the oil at an even rate of 20 gms. an hour.

(2) The vacuum is broken and the bubbling of $SO_2$ is terminated, permitting the pressure to rise to atmospheric pressure, and at this time, and also during steps 3, 4 and 5, a blanket of $SO_2$ is maintained on the surface of the batch.

(3) The batch is gently agitated for one-half hour and at the start of this period 106.6 gms. of NaOH flakes are added to the batch, the temperature still being maintained at 300° C.

(4) The agitation is terminated and the reaction vessel is again evacuated, to a pressure just short of that producing excessive foaming, for instance, 400 mm. of mercury, this condition being maintained for an additional period of one-half hour, still at 300° C.

(5) Application of heat is terminated and the batch is allowed to cool to 200° C. (requiring about one and one-half hours), during which time the reduced pressure (400 mm. of mercury) is maintained.

(6) Upon reaching 200° C., the vacuum is broken by admitting air and the batch poured into a vulcanizing kettle.

(7) Upon further cooling to 135° C., a mixture of sulphur, zinc oxide and Captax pastes are added (500 gms. sulphur paste, 110 gms. ZnO paste and 64.2 gms. mercaptobenzthiazole paste), the batch being vigorously agitated during this addition, and the temperature dropping further to about 120° C. The sulphur paste is prepared of finely ground sulphur dispersed in linseed oil in the proportions of two parts by weight of sulphur to each part by weight of linseed oil. The zinc oxide paste is composed of zinc oxide and linseed oil in the proportions of two parts of the former to one part of the latter. The mercaptobenzthiazole paste is also made with linseed oil, in the proportions of about four parts by weight of mercaptobenzthiazole to three parts of linseed oil.

(8) The temperature is then maintained at about 120° C. to 125° C. until the desired degree of vulcanization has taken place, which may require from about 2 to 4 hours, for instance, 3¼ hours, depending somewhat on the particular batch of oil, heating conditions, etc. The time is calculated from the first addition of sulphur. The progress of vulcanization may be determined in various ways, such as by observing the consistency of the mass. When the mass thickens to the degree rendering further agitation difficult, if not impractical, the vulcanization has reached the stage hereinabove identified as fully vulcanized. A further test for full vulcanization may be made by inserting a paddle into the mass and when the mass shows a tendency to break away from the paddle as it is drawn out, full vulcanization has been reached. Still another test which may be used is the placing of sample drops on a flat surface, such as cardboard, glass or metal plate, and when such drops, even though sticky, may be rolled off with the finger, the degree of vulcanization is "full."

(9) The vulcanized product is poured out to cool and set.

For purposes of convenient identification herein, the vulcanized oil product of the foregoing treatment will hereinafter be referred to as vulcanized oil A.

Example 4

A batch of 200 grams of vulcanized oil A, vulcanized to the full stage, was worked on a three roller paint mill at room temperature and to this batch an aqueous solution containing both methyl cellulose and sodium hydroxide was added. This solution was made up of 14.4 grams of a 10% aqueous sodium hydroxide solution and 186 cc. of a 1% aqueous methyl cellulose solution. The combined solutions were added in small increments. The material dispersed readily and was easily diluted with water. A film prepared from this dispersion was quite solid.

Example 5

A batch of 300 grams of vulcanized oil A, vulcanized to the full stage, was worked in a Werner and Pfleiderer kneading machine (of laboratory size) at room temperature. 48 grams of a 10% aqueous sodium hydroxide solution were added slowly and thereafter a methyl cellulose solution was added, the methyl cellulose solution being made up of 10 grams of a 2% solution added to 247 cc. of water.

The dispersion diluted readily with water, and was stable. The viscosity of the dispersion was also very low.

Examples 6-8 (Comparative Series)

In order to indicate the effect of varying the quantity of soap present, a comparative series of examples were carried out all employing sodium hydroxide as the soap forming ingredient. Various factors of this comparative series are indicated in Table I below, which table also includes Example 4 referred to above for purposes of comparison.

In each of Examples 6, 7 and 8 the vulcanized oil employed was that herein identified as vulcanized oil A, vulcanized to the full stage, and in each case one gram of methyl cellulose was employed for each 100 grams of oil A, the water content being such as to give 50% solids. The methyl cellulose and sodium hydroxide were both introduced by the medium of a single aqueous solution.

Table I

| Ex. No. | Sodium hydroxide (gms. per 100 gms. of oil A) | Viscosity of dispersion |
|---|---|---|
| 4 | .72 | Paste-like. |
| 6 | .8 | Similar to Ex. 4. |
| 7 | 1.6 | Pasty liquid. |
| 8 | 3.2 | Same as Ex. 7. |

The foregoing table clearly indicates that increase in the quantity of soap present reduces the viscosity of the resultant dispersion or emulsion, although comparison of Example 8 with Example 7 indicates that increase in the amount of sodium hydroxide beyond about 1.6 gms. (per 100 gms. of oil) does not further reduce the viscosity of the dispersion in this series. Apparently the 1.6 gms. represents approximately that quantity of alkali required to neutralize the free fatty acids present in vulcanized oil A.

In the two following experiments raw linseed oil was employed which had been treated in accordance with steps 1 to 6 inclusive of the treatment process of copending application 439,513 as summarized above. Thus, this oil was preliminarily subjected to treatment with $SO_2$ and then with sodium hydroxide. For convenience hereinafter, this oil is identified as fatty oil B.

In these two experiments fatty oil B was subjected to vulcanization under the conditions set out in steps 7 and 8 of the outline of the treatment process of application 439,513, except that the vulcanization time was altered so as to indicate comparative results with different degrees of vulcanization. In both of these experiments the degree of vulcanization yielded a partially vulcanized product. Full vulcanization of the same pretreated oil would have required from 3 to 4 hours.

Example 9

A batch of 100 grams of fatty oil B was vulcanized for one hour, yielding a partially vulcanized product. An aqueous solution was prepared containing 50 grams of an aqueous methyl cellulose solution of 1% concentration, 7.2 grams of an aqueous sodium hydroxide solution of 10% concentration, and 43 grams of water. Both the vulcanized oil B and the solution were brought to 75° C. and the aqueous solution was added to the oil under agitation.

A dispersion of low viscosity was secured, which was stable and easily dilutable with water.

Example 10

A batch of 100 grams of fatty oil B was vulcanized for two and three quarter hours, yielding a partially vulcanized product, and an aqueous solution was prepared containing 10 grams of a sodium oleate solution of 10% concentration, 1 gram of methyl cellulose and 82 grams of water. The aqueous solution and the vulcanized fatty oil B were mixed together under agitation at 75° C. The emulsion or dispersion was stable and was readily diluted with water.

Examples 11 to 13 (Comparative Series)

In each example of this series the material employed to form the dispersion was an ester gum varnish base of 25 gallon length. This varnish base was initially prepared as indicated below:

| | Parts |
|---|---|
| "$SO_2$ oil" | 667 |
| Ester gum | 333 |
| Sulphur | 10 |

The "$SO_2$ oil" comprised raw linseed oil preliminarily treated in a manner similar to steps 1 and 2 of the illustrative process referred to above, as follows:

A batch of 8,000 grams of raw linseed oil was heated under vacuum, at a pressure of 100 mm. Hg. in a 22 liter flask and during rise in temperature to 300° C. $SO_2$ was bubbled through the oil at a rate of 20 grams per hour. The oil was kept for five hours at 300° C., during all of which time the bubbling of $SO_2$ was continued, and then the heating was stopped and the mass was allowed to cool to 200° C., $SO_2$ still being bubbled therethrough during drop in temperature. When 200° C. was reached, the mass was permitted to cool to room temperature. The oil prepared in this manner is hereinafter referred to as "$SO_2$ oil."

The varnish base was prepared by heating the ester gum and oil together to 160° C. and then adding the sulphur and holding the temperature at 160° C. for ten minutes.

In each example of this group after preparation of the varnish base in the above manner, driers were added, 1.23 cc. of a drier solution being added to each 100 gram batch of the varnish base. The drier solution was as follows:

A mixture of naphthenate driers in mineral spirits containing in each 1.23 cc.:

|  | Grams |
|---|---|
| Cobalt (metal) | 0.03 |
| Lead (metal) | 0.3 |
| Manganese (metal) | 0.02 |

Example 11

A 100 gram batch of the foregoing varnish base, with 1.23 cc. of the drier solution was worked on a three roller paint mill and 16 grams of a 10% aqueous sodium hydroxide solution were added. Following the addition of this solution, 52 grams of a 2% aqueous methyl cellulose solution, and finally 36 grams of water were incorporated. In this example the wetting agent (a soap) was produced in situ by reaction of the sodium hydroxide with fatty acids present.

Example 12

A 100 gram batch of the foregoing varnish base, with 1.23 cc. of the drier solution was worked on a three roller paint mill and 5 grams of sodium stearate were added. Thereafter 52 grams of a 2% aqueous methyl cellulose solution were incorporated, and finally 50 grams of water were added.

This emulsion or dispersion was also readily dilutable with water.

Example 13

A 100 gram batch of the foregoing varnish base, with 1.23 cc. of the drier solution was worked on a three roller paint mill and 52 grams of a 2% aqueous Duponol ME solution were added, followed by 52 grams of a 2% aqueous methyl cellulose solution.

The dispersion was readily dilutable with water.

Example 14

A mixture of 100 grams of the varnish base used in Examples 11 to 13 (containing 1.23 cc. of the above described drier solution) was thinned with 100 grams of mineral spirits, the varnish base and spirits being thoroughly agitated together. To this thinned mixture, 16 grams of a 10% aqueous sodium hydroxide solution were added under agitation, and this was followed by addition of 102 grams of a 2% methyl cellulose solution and 68 grams of water, these latter additions being made gradually and stirred into the mixture. The resulting product was an oil-in-water emulsion of very high viscosity, notwithstanding the fact that the solids present constituted only 25% of the total mixture.

Still another procedure which may be employed in securing a vulcanized fatty oil dispersion containing both methyl cellulose and a wetting agent, is illustrated in examples given below. In accordance with these examples the wetting agent is incorporated in the oil prior to vulcanization thereof. For this purpose a process may be adopted in accordance with the disclosure of my copending application Serial No. 439,513, the nine steps of said process being briefly outlined above just ahead of Example 4. Vulcanized oil A produced by said process already incorporates an alkali metal soap formed in situ by reaction of the added sodium hydroxide with fatty acids present. Such a soap acts as a wetting agent during dispersion notwithstanding the fact that the vulcanization step intervenes between the time of incorporation of the soap and the time of effecting the dispersion.

Example 15

A batch of 100 grams of vulcanized oil A, vulcanized to the full stage, was worked on a paint mill with an aqueous solution made up of 1 gram methyl cellulose and 100 grams of water.

The dispersion was of relatively high viscosity but was easily dilutable and was stable.

Examples 16 to 24 (Comparative Series)

This series also demonstrates that process according to which a water soluble soap is incorporated in the oil prior to vulcanization. In this series fatty oil B (preparation of which is described above just ahead of Example 9) was employed, each batch of the oil being vulcanized for a different length of time, as is indicated in Table II just below.

Table II

| Example | Vulcanization time | Method of dispersion | Dispersing temperature |
|---|---|---|---|
|  | Hours |  | °C. |
| 16 | 1½ | Agitator | 75 |
| 17 | 2 | do | 75 |
| 18 | 2¼ | do | 75 |
| 19 | 2½ | do | 75 |
| 20 | 2¾ | do | 75 |
| 21 | 3 | do | 75 |
| 22 | 3¼ | do | 75 |
| 23 | 3½ | Paint mill | (¹) |
| 24 | 3¾ | do | (¹) |

¹ Room temperature.

With the particular batch of oil here used, the vulcanization time referred to above for each of Examples 16 to 22 inclusive was such as to yield a partially vulcanized product, in accordance with the definition of that term given hereabove. On the other hand, the time of vulcanization employed in Example 24 was such as to yield a fully vulcanized product, as determined by tests of the type described above in step 9 of the process set out just ahead of Example 4. The time employed in Example 23 was such as to produce a practically fully vulcanized product upon cooling at a low rate, this particular product having become practically infusible during cooling to room temperature.

In all of the above examples methyl cellulose was added in a 1% aqueous solution, the quantity of said solution being sufficient to incorporate 1% methyl cellulose on the basis of the vulcanized oil present.

All of the dispersions were made with ease and all were readily dilutable with water.

I claim:

1. A stable oil-in-water dispersion of a vulcanized fatty oil, containing methyl cellulose and another surface-active agent which reduces the surface tension of the oil-water interface, the methyl cellulose constituting a minor amount and not substantially more than about 2% in relation to the oil.

2. A product in accordance with claim 1 in which said other surface-active agent is selected from the class consisting of water soluble soaps, and salts of sulphonated organic compounds.

3. A product in accordance with claim 1 in which said other surface-active agent is a water soluble soap.

4. A product in accordance with claim 1 in which said other surface-active agent is an alkali metal soap.

5. A product in accordance with claim 1 in which said other surface-active agent is a water soluble soap selected from the class consisting of the soaps of ammonia and organic amines.

6. A product in accordance with claim 1 in which the methyl cellulose is present from about .1% to about 2% of the dispersed phase.

7. A product in accordance with claim 1 in which the methyl cellulose is present in an amount about 1% of the dispersed phase.

8. A product in accordance with claim 1 in which said other surface-active agent is present in the dispersion medium.

9. A product in accordance with claim 1 in which the fatty oil is fully vulcanized.

10. A product in accordance with claim 1 in which the vulcanized fatty oil is the reaction product resulting from vulcanization of a fatty oil heat bodied to a viscosity of at least Q on the Gardner scale.

11. A product in accordance with claim 1 in which the vulcanized fatty oil is a vulcanized fatty oil pretreated with $SO_2$ at elevated temperatures.

12. A coating composition comprising a stable dispersion of the oil-in-water type, the dispersion medium comprising water and the dispersed phase comprising film forming vehicle solids incorporating a vulcanized fatty oil of the class of fatty oils having at least semi-drying characteristics, the dispersion containing methyl cellulose in minor proportions not substantially above about 2% in relation to the dispersed phase and further containing another surface-active agent which reduces the surface tension of the oil-water interface.

13. A coating composition in accordance with claim 12 in which said vehicle solids also incorporate a resin.

14. A coating composition in accordance with claim 12 in which said vehicle solids also incorporate a vulcanized resin.

15. A coating composition in accordance with claim 12 in which the vehicle solids incorporate a conjointly vulcanized fatty oil-plus-resin mixture.

16. A coating composition in accordance with claim 12 in which the methyl cellulose is present in an amount from about 0.01% to about 2% of the dispersed phase.

17. A coating composition in accordance with claim 12 in which methyl cellulose is present in an amount about 1% of the dispersed phase.

18. A coating composition in accordance with claim 12 in which said other surface-active agent for reducing the surface tension of the oil-water interface is selected from the group consisting of water soluble soaps and salts of sulphated fatty alcohols.

19. A coating composition in accordance with claim 12 in which said other surface-active agent for reducing the surface tension of the oil-water interface is an alkali metal soap of a fatty acid.

20. A coating composition in accordance with claim 12 in which said other surface-active agent for reducing the surface tension of the oil-water interface is a sodium soap of a fatty acid.

21. A coating composition in accordance with claim 12 in which the fatty oil is only partially vulcanized.

22. A coating composition in accordance with claim 12 in which said oil is a vulcanized fatty oil heat bodied prior to vulcanization to a viscosity higher than Q on the Gardner scale.

23. In the art of making stable oil-in-water dispersions the dispersed phase of which incorporates a vulcanized fatty oil, the method which comprises working the material to be dispersed on a paint mill of the multi-roller type, and adding methyl cellulose, water, and another surface-active agent which reduces the surface tension of the oil-water interface to said material while it is being worked on the mill.

24. A method in accordance with claim 23 in which an aqueous methyl cellulose solution is added to the material being worked on the mill prior to addition of said other surface-active agent.

25. In the art of making stable oil-in-water dispersions the dispersed phase of which incorporates a vulcanized fatty oil, the method which comprises working the material to be dispersed in a kneading machine, and adding methyl cellulose, water, and another surface-active agent which reduces the surface tension of the oil-water interface to said material while it is being worked in the kneading machine.

26. A method in accordance with claim 25 in which said other surface-active agent is formed in situ by addition of an aqueous base solution capable of forming a soap with free fatty acids present in the dispersed phase, and in which the addition of said base solution is made prior to the addition of the methyl cellulose.

27. A stable oil-in-water dispersion, the dispersed phase of which incorporates a fatty oil containing thoroughly dispersed therein a water soluble salt of the class which consists of soaps of alkali metals, ammonium and amines, which said oil is in a fully vulcanized state, and the dispersion further containing methyl cellulose in minor amounts not substantially above about 2% in relation to the oil.

LÀSZLÓ AUER.